US009265342B2

(12) United States Patent
Sagel et al.

(10) Patent No.: US 9,265,342 B2
(45) Date of Patent: Feb. 23, 2016

(54) ROTARY BEARING OF A ROTARY FITTING OF A CUPBOARD

(71) Applicant: Vauth-Sagel Holding GmbH & Co. KG, Brakel (DE)

(72) Inventors: Peter Sagel, Paderborn (DE); Claus Sagel, Bielefeld (DE)

(73) Assignee: Vauth-Sagel Holding GmbH & Co. KG, Brakel (DE)

( * ) Notice: Subject to any disclaimer, the term of this patent is extended or adjusted under 35 U.S.C. 154(b) by 109 days.

(21) Appl. No.: 14/075,041

(22) Filed: Nov. 8, 2013

(65) Prior Publication Data

US 2015/0131932 A1 May 14, 2015

(51) Int. Cl.
*F16C 35/02* (2006.01)
*A47B 49/00* (2006.01)

(52) U.S. Cl.
CPC ............... *A47B 49/006* (2013.01); *F16C 35/02* (2013.01)

(58) Field of Classification Search
CPC .............................. F16C 35/10; A47B 49/006
See application file for complete search history.

(56) References Cited

U.S. PATENT DOCUMENTS

| 4,587,908 A * | 5/1986 | DeBruyn ............. A47B 49/006 108/142 |
| 7,922,016 B1 | 4/2011 | Domenig et al. |
| 8,356,953 B2 | 1/2013 | Sagel |
| 2014/0147200 A1 * | 5/2014 | Baro ................... A47B 49/006 403/382 |

* cited by examiner

*Primary Examiner* — Thomas R. Hannon
(74) *Attorney, Agent, or Firm* — Thomas | Horstemeyer, LLP (57) ABSTRACT

A rotary bearing for rotably supporting an article-carrying member at a supporting column of a rotary fitting of a cupboard comprises a supporting member having a first component and a second component movably connected to each other. In a closed state of the supporting member, the first and the second component together define a cylinder envelope shaped inner surface encircling an aperture of the supporting member; and they together provide a circular track at a top face of the supporting member. In an open state of the supporting member, the first and the second component provide an access opening to the aperture that has a width of at least about the diameter of the cylinder envelope shaped inner surface. A pin is fixed at one of its ends to the first component of the supporting member, and it extends from the first component of the supporting member into the aperture.

13 Claims, 7 Drawing Sheets

ROTARY BEARING OF A ROTARY FITTING OF A CUPBOARD

FIELD OF THE INVENTION

The present invention generally relates to a rotary bearing for ratably supporting an article-carrying member at a supporting column of a rotary fitting of a cupboard.

In particular, the invention relates to a rotary bearing for ratably supporting an article-carrying member at a supporting column of a rotary fitting of the "Lazy Susan" type for a corner cupboard, in which article-carrying members, such as shelf or baskets for example, are not circular but have cut-outs which have to be brought to a defined position to allow for closing the corner cupboard.

BACKGROUND OF THE INVENTION

U.S. Pat. No. 7,922,016 B1 discloses rotary bearing for ratably supporting an article-carrying member at a supporting column of a rotary fitting of a shelf system. The rotary bearing is built by a pin which transversally extends through a transverse clearance hole in the supporting column. The pin comprises a head whose diameter is enlarged as compared to that is of its shank. Further, the pin comprises arcuate clamping arms which in circumferential direction extend from the head around the supporting column to secure the pin in place on the supporting column. The article-carrying member is provided with a counter bearing which has two circular tracks at its underside. The circular tracks are arranged on different levels in axial direction along the supporting column and extend around the supporting column. The circular track at the higher level is supported by the head of the pin, whereas the circular track at the lower level is supported by the free end of the pin projecting through the supporting column. Both circular tracks have recesses which are offset from one another by 180°. The head of the pin and its free end enter the two recesses simultaneously and in this way define a basic position in rotation for the article-carrying member.

U.S. Patent Application Publication 2011/0127228 A1 discloses a rotary fitting having a rotary bearing for rotably supporting an article-carrying member at a supporting column of the rotary fitting. The rotary bearing comprises a supporting ring having a circular track at its top face which is in engagement with a counter bearing of the associated article-carrying member. The supporting ring is mounted to the supporting column by means of a pin. The pin extends through a transverse clearance hole in the supporting column. The ends of the pin projecting beyond the supporting column are received by the underside of the supporting ring such that the supporting ring is fixed in position and in rotation on the supporting column.

SUMMARY OF THE INVENTION

In a first aspect, the invention elates to a rotary bearing for rotably supporting an article-carrying member at a supporting column of a rotary fitting of a cupboard, wherein the rotary bearing comprises a supporting member and a pin. The supporting member has a first component and a second component movably connected to each other. Further, the supporting member has an open and a closed state. In the closed state of the supporting member, the first and the second component together define a cylinder envelope shaped inner surface of the supporting member, wherein the cylinder envelope shaped inner surface encircles an aperture of the supporting member. In the closed state, the first and the second component together provide a circular track at a top face of the supporting member. In the open state of the supporting member, the first and the second component provide an access opening to the aperture of the supporting member, wherein the access opening has a width of at least about the diameter of the cylinder envelope shaped inner surface. The pin of the rotary bearing has two ends. The pin is fixed to the first component of the supporting member at one of its two ends, and it extends from the first component of the supporting member into the aperture.

In another aspect, the invention relates to a rotary fitting for a corner cupboard comprising a supporting column with a transverse clearance hole; fastening members for the supporting column to hold the supporting column in a vertical orientation and fixed in rotation in the corner cupboard; at least one article-carrying member rotating about the supporting column; a rotary bearing; and a counter bearing. The rotary bearing comprises a supporting member and a pin. The supporting member comprises a first component and a second component which are movably connected to each other. The supporting member has an open state and a closed state. In the closed state of the supporting member, the first and the second component together encircle the supporting column and together define a circular track at the top face of the supporting member. In the open state, the first and the second component provide an access opening for the supporting column, the access opening having a width of at least a diameter of the supporting column. The pin has two ends. At one of its ends, the pin is fixed to the first component of the supporting member. In the closed state of the supporting member, the pin extends from the first component of the supporting member into the transverse clearance hole of the supporting column. The counter bearing is configured to be mounted to the article-carrying member in such a way as to be fixed thereto in position and rotation. The counter bearing comprises a bottom face abutting against the top face of the supporting member in its closed state. At the bottom face of the counter bearing, a complementary track is provided which is complementary to the circular track at the top face of the rotary bearing.

In another aspect, the invention relates to a supporting ring for rotably supporting an article-carrying member at a supporting column of a rotary fitting of a cupboard comprising a supporting member and a pin which is integrally built with the supporting member. The supporting member has an open ring state and a closed ring state. In the closed ring state, the supporting member defines a cylinder envelope shaped inner surface, the cylinder envelope shaped inner surface encircling an aperture of the supporting ring and the pin radially extending from the supporting member into the aperture. Further, in the closed ring state, the supporting member provides a circular track at its top face.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

The new rotary bearing according to this disclosure is configured to rotably support an article-carrying member at a supporting column of a rotary fitting of a cupboard. The rotary bearing comprises a supporting member having a top face for supporting the article-carrying member. In particular, a circular track is provided at the top face for guiding the rotation of the article-carrying member around the supporting column to which the rotary bearing is fixed. Further, the rotary bearing comprises a pin by means of which the rotary bearing ca be fixed to the supporting column such as to be fixed in position and in rotation.

The supporting member comprises a first component and a second component which are movably connected to each other. By moving the first component relative to the second component, the supporting member can be transferred from an open state to a closed state. Preferably, the first component and the second component can be reversibly moved relative to each other such that the supporting member can be transferred from its open state to its closed state and vice versa.

In the closed state of the supporting member, the first and the second component of the supporting member define a cylinder envelope shaped inner surface of the supporting member, the cylinder envelope shaped inner surface encircling an aperture of the supporting member. Further, the first component and the second component together provide the circular track at the top face of the supporting member in the closed state.

Preferably, the dimensions of the aperture, i.e. of the cylinder envelope shaped inner surface are such that the supporting column of the rotary fitting fits into the aperture of the supporting member in the closed state. According to an embodiment of the rotary fitting, the cylinder envelope shaped inner surface may be adapted to the size of the supporting column such that the entire cylinder envelope shaped inner surface abuts against the supporting column. For facilitating a tight fit, the cylinder envelope shaped inner surface may be provided with an elastic coating. Further, a coating may be provided that increases the grip of the cylinder envelope shaped inner surface at the supporting column.

In the open state of the supporting member, an access opening to the aperture of the supporting member is provided. The access opening has a width of at least about the diameter of the cylinder envelope shaped inner surface. If the diameter of the cylinder envelope shaped inner surface is adapted to the diameter of the supporting column of the rotary fitting, the access opening of the supporting member is large enough to let the supporting column pass through the access opening into the aperture (and out of the aperture, respectively). Thus, the rotary bearing can be put onto (and also removed from) the supporting member, when the rotary bearing is in the open state, whereas, in the closed state, the rotary bearing is fixed in position and rotation to the supporting column.

The pin of the rotary bearing is fixed at one of its ends to the first component of the supporting member a id extends from the first component into the aperture of the supporting member. The other end of the pin is a free end which—at least in the open state—is not fixed to the supporting member.

It is an option that the pin does not extend through the whole aperture, but only spans a part of the diameter of the aperture. In this case, another pin may be provided which is fixed to the second component and extends from the second component into the aperture, wherein, in the closed state, the pin and the other pin are opposing pins. In an preferred embodiment however, the pin extends from the first component through the whole aperture up to and into the second component of the supporting member such that the free end of the pin is in engagement with the second component of the supporting member in the closed state of the supporting member. According to this embodiment, the length of the pin is more than the diameter of the cylinder envelope shaped inner surface of the supporting member. In an embodiment of the rotary bearing, the second component may comprise a recess for receiving the other end of the ends of the pin in the closed state of the supporting member. In this case, the pin is in connection and engagement, respectively, with the supporting member at both of its ends in the closed state of the supporting member. In this way the stability of the entire rotary bearing is increased when it is mounted to the supporting column, and a risk of rotation of the supporting member on the supporting column is decreased.

The pin may be fixed to the first component of the supporting member, for example, by gluing, screwing, damping or the like. It is also an option that the pin is integrally built with the first component of the supporting member, in addition, the first component and the second component of the supporting member may also be integrally built. However, it is also an option that the first and the second component are built as separate parts which are movably connected to each other.

In the closed state of the supporting member, the first and the second component may each encircle about half of the aperture. According to an embodiment of the rotary bearing, the first and the second component are built as half rings with two pairs of connected opposing ends in the closed state. In the open state, only one of the pairs of opposing ends of the first and the second component are movably connected to each other.

According to an embodiment of the rotary bearing, the first component and the second component of the supporting member are movably connected via a hinge. The hinge allows for moving the first component and the second component relative to each other. In an embodiment, a hinge is used which allows for swiveling the first component relative to the second component about an axis which is parallel to the cylinder axis of the cylinder envelope shaped inner surface of the supporting member.

It is an option that the hinge, the first component and the second component are built as separate pieces, wherein the first component and the second component are connected to each other via the hinge. In order to realize the integral design of the first and the second components, however, the hinge may be an integral hinge or a living hinge. According to this embodiment, the supporting member may be built as one piece by injection molding, for example. This will decrease the risk of losing one of the parts of the supporting member.

When the first and the second component of the supporting member provide the access opening to the aperture of the supporting member, the first component and the second component each have a free end confining the access opening. For connecting these free ends in the closed state of the supporting member, the first component and the second component may comprise mutually fitting snap-in configurations at these free ends, the snap-in configurations locking the first component to the second component in the closed state of the supporting member. The snap-in configurations may be configured such that a reversible locking of the first component to the second component in the closed state is enabled. However, they also may be configured such that the connection of the first and the second component at their free ends is permanent once they are locked.

If the snap-in configurations comprise a snap-in latch and a snap-in recess, the locking of the first and the second component in the closed state is enabled by the snap-in latch engaging in the snap-in recess. For securing the engagement of the snap-in latch in the snap-in recess in the closed state, the snap-in configurations preferably comprise counter supporting surfaces. The counter supporting surfaces may be provided at the free ends of the first and the second component. In an embodiment of the rotary bearing, the first and the second component comprise a projection and a mutually fitting recess at their free ends, wherein surfaces of the projection and surfaces confining the recess contacting each other in the closed state serve as the counter supporting surfaces. Further counter supporting surfaces may be provided in an area in which the first and the second component are movably connected to each other.

For securing the engagement of the snap-in latch in the snap-in recess in the closed state of the supporting member, the counter supporting surfaces are configured such that the first component is supported by the second component in a direction opposing the direction in which the snap-in latch snaps into the snap-in recess. The counter supporting surfaces may be configured such that the engagement of the snap-in latch in the snap-in recess in the closed state is secured both in axial and in radial direction with regard to the cylinder envelope shaped inner surface.

According to an embodiment of the rotary bearing, mutually fitting aligning configurations are provided in order to ease the alignment of the first component to the second component during the transfer of the supporting member from its open state into its closed state. The mutually fitting aligning configurations are preferably provided at the free ends of the first component and the second component. The mutually fitting aligning configurations do not contact each other in the open state, but interact during the transfer of the supporting member from its open state into its closed state.

In the rotary fitting according to this disclosure, each article-carrying member is supported on the supporting column via one rotary bearing and an associated counter bearing. The counter bearing is mounted to the article-carrying member such that it is fixed in state and rotation thereon, wherein the counter bearing is rotably supported on the rotary bearing.

The rotary bearing comprises a supporting member having a first component and a second component which are moveably connected to each other. Further, the rotary bearing comprises a pin that is fixed at one of its ends to the first component of the supporting member. In particular, the rotary bearing may be one of the embodiments of the rotary bearing described above.

The supporting member has an open state aid closed state. In the open state, the first and the second component of the supporting member provide an access opening for the supporting column. The access opening has a width of at least the diameter of the supporting column. Hence, in the open state, when the access opening is provided, the rotary bearing can be put onto the supporting column with the pin being inserted in and moved through a transverse clearance hole in the supporting column. For mounting the rotary bearing on the supporting column such that it is fixed in position and rotation thereon, the supporting member is then transferred from the open state into its closed state, in particular by moving the first component relative to the second component.

In the closed state of the supporting member, the first and the second component together encircle the supporting column. In terms of the above description of the new rotary bearing this means that the supporting column is located in the aperture of the supporting member, and it is encircled by the cylinder envelope shaped inner surface of the supporting member. The pin extending from the first component of the supporting member into the transverse clearance hole and the first and the second component encircling the supporting column both ensure that the rotary bearing is fix in position and rotation relative to the supporting column, when the supporting member is in the closed state. In particular, since the supporting member completely encircles the supporting column, a stable mounting may be achieved which is not only stable with regard to a rotation about the supporting column but also a tilt about any axis perpendicular thereto.

In the closed state, a circular track is provided at the top face of the supporting member. The counter bearing supported by the rotary bearing comprises a complementary track at its bottom face abutting against the top face of the supporting member. The circular track and the complementary track interact with each other such that the rotation of the counter bearing and thus the article-carrying member about the supporting column is guided. According to an embodiment, mutually fitting sloping regions are provided along the circular track and the complementary track for defining at least one particular rotation position of the article-carrying member about the supporting column, in which the cupboard may be closed without colliding with the article-carrying member.

As already described above there are various possibilities regarding the connection between the first component, the second component and the pin. According to an embodiment, the pin is integrally built with the first component of the supporting member. Further, the first and the second component may be integrally built. However, they also may built as separate pieces.

In an embodiment of the inventive rotary fitting, the supporting member comprises a recess for receiving a portion of the pin projecting beyond the supporting column, when the rotary bearing is mounted on the supporting column. I.e., in the closed state, the pin extends from the first component of the supporting member through the transverse clearance hole of the supporting column and is received in the recess of the second component of the supporting member. Thus, a stable mounting of the rotary bearing on the supporting column may be achieved. In particular, the risk of rotation of the rotary bearing about the supporting column is reduced and stability is increased, since the pin is in engagement with the supporting member at both of its ends.

In an embodiment of the rotary fitting, the counter bearing comprises an outer rim. The outer rim projects downwards in axial direction of the supporting column and at least partially overlaps the supporting member in axial direction, and circumferentially encircles the top face of the supporting member. In particular, the outer rim may serve as a stabilization stabilizing the rotary bearing and securing the closed state of the supporting member, when the rotary bearing is mounted on the supporting column.

The inventive supporting ring is configured for rotably supporting an article-carrying member at a supporting column of a rotary fitting cupboard. The supporting ring comprises a supporting member having an open ring state and a closed ring state. Further, the supporting ring comprises a pin which is integrally built with the supporting member.

In the open ring state, the supporting member does not have the shape of a closed ring. Instead, in the open ring state an opening may be provided, wherein the opening is configured such that the supporting column can pass through the opening. It is an option that the supporting member comprises two half rings which are not connected to each other in the open ring state, whereas they are connected at their circumferential ending portions in the closed ring state for mounting the supporting ring to the supporting column. In an embodiment of the supporting ring, mutually snap-in configurations are provided at the ending portions of the half rings for locking the half rings in the closed ring state.

In the closed ring state, the supporting member defines a cylinder envelope shaped inner surface which encircles an aperture of the supporting ring, and the pin radially extends from the cylinder envelope shaped inner surface of the supporting member into the aperture. Further, in the closed ring state, a circular track is provided at the top face of the supporting ring for guiding the rotation of the article-carrying member about the supporting column.

Regarding further features of the supporting ring it is referred to the respective features described above with regard to the new rotary bearing.

Figure 1:
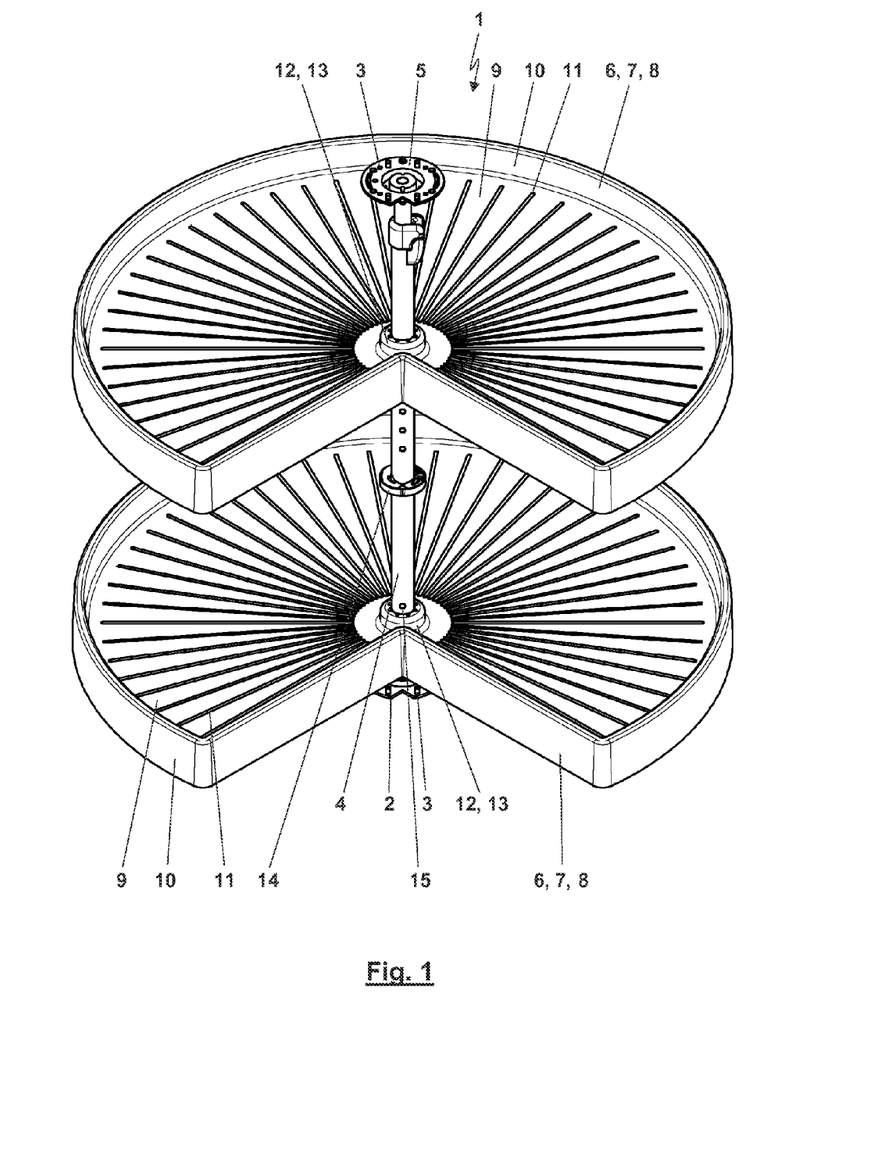
FIG. 1 is a perspective view from above of a rotary fitting for a cupboard having two shelves.

Referring now in greater detail to the drawings, FIG. 1 illustrates a rotary fitting 1 for a corner cupboard (not shown). The rotary fitting 1 has a bottom fastening member 2 having a plurality of fastening holes 3 of different shapes. The fastening holes 3 allow for screwing the fastening member 2 to a floor panel of the corner cupboard by means of fastening screws passing through them. The fastening member 2 holds the bottom end of a supporting column 4, wherein the supporting column 4 is connected to the fastening member 2 to be fixed in rotation therewith. The top end of the supporting column 4 is likewise fastened to the corner cupboard by an upper fastening member 5 having a plurality of fastening holes 3. Two article-carrying members 6 in the form of shelves 7 are, rotably mounted on the supporting column 4 in such a way as to be able to be turned around it. The shelves 7 are substantially in the form of three quarters of circles. The cut-out which is missing from each of the shelves 7 allows to close the corner cupboard. When the corner cupboard is open, a part of each shelf 7 can be moved out of the corner cupboard by rotating the shelf 7 around the supporting column 4 such that easy access to the articles arranged on the shelf 7 is enabled.

The shelves 7 may be one-piece shaped bodies 8 of wood or plastic material having a main plate 9, a rim 10 and reinforcing ribs 11. At the center of the three quarters of circles the shelves 7 are mounted to shelf carriers 12. The shelf carriers 12 include counter bearings 13 for rotably supporting the shelves 7 on rotary bearings 14. The counter bearing 13 comprises an outer rim having a ring-like shape and essentially extending in axial direction of the supporting column 4. The outer rim of the counter bearing 13 partially overlaps the rotary bearing 14 in axial direction and encircles the rotary bearing 14 in circumferential direction. The rotary bearing 14 which is provided for supporting the upper one of the two shelves 7 is attached to the supporting column 4 at about the mid of its axial height. In FIG. 1 the upper shelf 7 is shifted upward along the axial direction of the supporting column 4 such that it is not yet supported by its associated rotary bearing 14. However, the lower shelf 7 is already supported by the rotary bearing 14. The associated rotary bearing 14 is not visible, since it is covered by the lower shelf 7 and its counter bearing 13. Further, the supporting column 4 comprises several transverse clearance holes 15 which are provided to allow for mounting further rotary bearings 14 on the supporting column 4 and/or for changing the height of one of the shelves 7.

Figure 2:
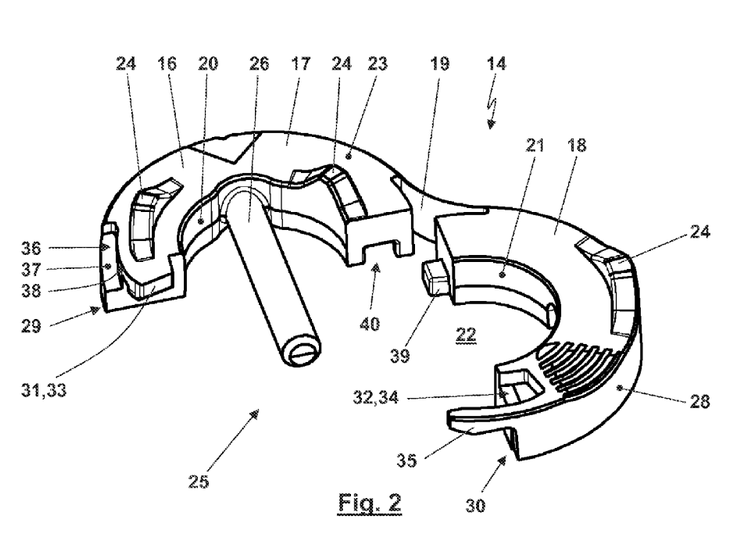
FIG. 2 is a perspective view from above of a rotary bearing with a supporting member in the open state.
Figure 3:
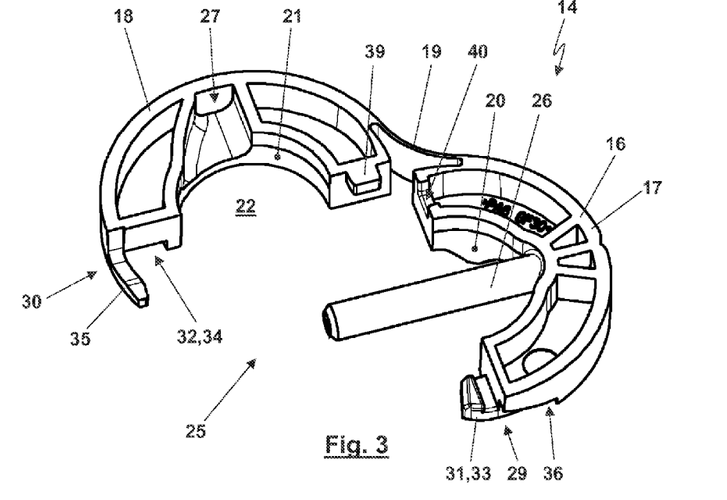
FIG. 3 is a perspective view from below of the rotary bearing shown in FIG. 2.
Figure 4:
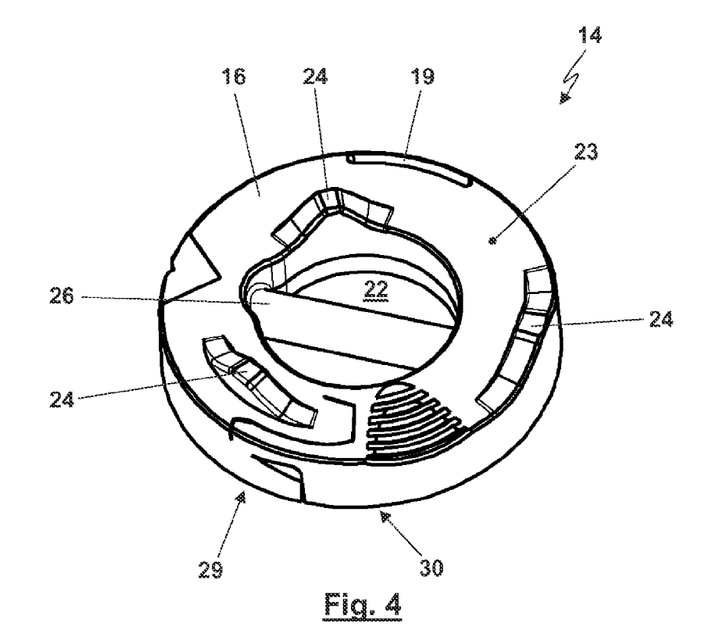
FIG. 4 is a perspective view from above of the rotary bearing shown in FIG. 2 with the supporting member being in the closed state.
Figure 5:
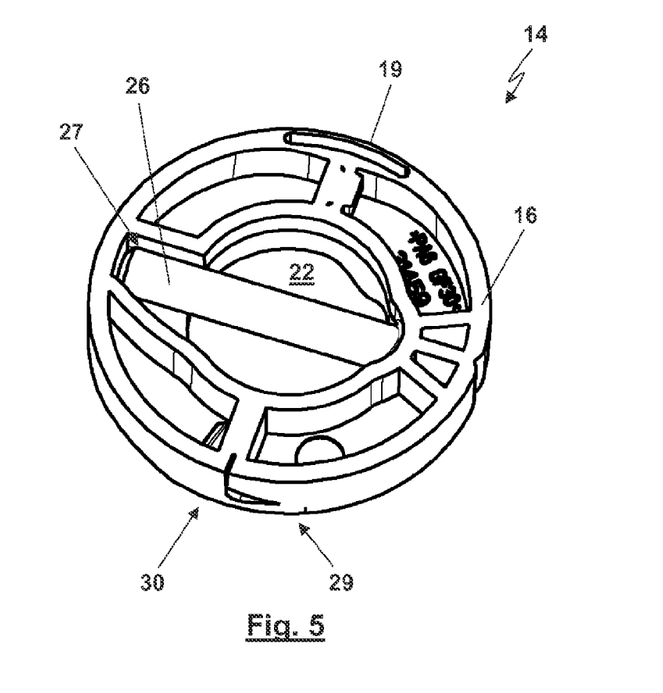
FIG. 5 is a perspective view from below of the rotary bearing shown in FIG. 4.

The rotary bearing 14 including a supporting member 16 is shown in detail in FIGS. 2 to 5. In FIGS. 2 and 3, the rotary bearing 14 is shown with its supporting member 16 being in an open state, whereas FIGS. 4 and 5 show the rotary bearing 14 with the supporting member 16 being in a closed state. The supporting member 16 has a first component 17 and a second component 18 which are movably connected by a living hinge 19. The first component 17 and the second component 18 both are basically shaped as half rings with inner surfaces 20 and 21. In the closed state of the supporting member 16, the inner surfaces 20 and 21 of the first component 17 and the second component 18 define a cylinder envelope shaped inner surface completely encircling an aperture 22 of the supporting member 16. The diameter of the cylinder envelope shaped inner surface of the supporting member 16 is dimensioned such that the supporting column 4 fits into the aperture 22, when the rotary bearing 14 is mounted on the supporting column 4.

At the top face 23 of the supporting member 16, a plurality of projections 24 are provided. As shown in FIG. 4, the projections 24 are located at different distances from the aperture 22, and each of the projections 24 is part of one of three circular tracks which are formed at the top face 23 of the supporting member 16 in the closed state. These circular tracks interact with complementary tracks that are provided at the bottom face of the counter bearings 13 abutting against the top face 23 of the supporting member 16, when the shelf 7 is rotably supported on the rotary bearing 14. The projections 24 define a basic position in rotation of the shelves 7 around the supporting column 4 like it is described in the U.S. Patent Application Publication 2011/0127228 which is herewith incorporated by reference. For bridging the vertical different in level provided by the projections 24, a force has to be applied during rotation of the shelve 7 about the supporting column 4. Once the vertical difference in level is overcome, the shelve 7 can be further rotated without any force to be overcome apart from friction.

In the open state of the supporting member 16 shown in FIGS. 2 and 3, the first component 17 and the second component 18 provide an access opening 25 to the aperture 22. The access opening 25 has a width which is larger than the diameter of the cylinder envelope shaped inner surface and the aperture 22 in the closed state, respectively. According to an embodiment of the rotary bearing, the width of the access opening 25 is configured to let the supporting column 4 pass through the access opening 25 into the aperture 22. Thus, due to the access opening 25 the rotary bearing 14 can be put onto the supporting column 4 in a direction perpendicular to the axial direction of the supporting column 4. In other words, the rotary bearing 14 can be put onto the supporting column 4 from the side.

In order to mount the rotary bearing on the supporting column 4 both fixed in position and rotation, the rotary bearing 14 comprises a pin 26 which fits into one of the transverse clearance holes 15 in the supporting column 4. The pin 26 is integrally built with the first component 17 of the supporting member 16 and extends from the first component 17 into the aperture 22 of the closed supporting member 16. As can be seen from FIG. 5, the pin 26 has a length which is larger than the diameter of the cylinder envelope shaped inner surface. The portion of the pin 26 extending beyond the cylinder envelope shaped inner surface is received in a recess 27 of the second component 18 of the closed supporting member 16. As shown in FIGS. 3 and 5, a free width of the recess 27 widens in a direction from the outer surface 28 of the second component 18 to its inner surface 21 such that the pin 26 is easily received in the recess 27 when the supporting member 16 is closed.

In the open state shown in FIGS. 2 and 3, the first component 17 and the second component 18 each have a free end 29, 30. At the free ends 29 and 30, mutually fitting snap-in configuration 31 and 32 are provided. In particular, the snap-in configuration 31 at the free end 29 of the first component 17 is a snap-in latch 33, whereas the snap-in configuration 32 at the free end 30 of the second component 18 is a snap-in latch 34. Besides, a projection 35 and a mutually fitting recess 36 are provided in the region of the free ends 29, 30 at the outer circumference of the supporting member 16.

When the supporting member 16 is transferred from the open state shown in FIGS. 2 and 3 into the closed state shown in FIGS. 4 and 5, the first component 17 and the second component 18 first come into contact via the projection 35 that contacts surfaces 37, 38 confining the recess 36. During the subsequent movement, the projection 35 slides along the surfaces 37, 38, i.e. the first component 17 is aligned to the second component 18. Thus, the projection 35 and the surfaces 37, 38 confining the recess 36 serve as aligning configurations. With further approach of the free ends 29, 30, the snap-in latch 33 comes into contact with the free end 30 such that the snap-in latch 33 first bends in axial direction and finally snaps into the snap-in recess 34. Thus, in the closed state, the snap-in latch 33 is in engagement with the snap-in recess 34, i.e. the first component 17 and the second component 18 are locked. In the closed state, the projection 35 is supported at the surfaces 37 and 38 in axial and radial direction. In particular, the projection 35 is supported at the surfaces 37 and 38 in opposite direction of the engagement of the snap-in latch 33 and the snap-in recess 34. Thus, the surfaces 37 and 38 and outer surfaces of the projection 35 being in contact with surfaces 37, 38 are counter supporting surfaces that secure the engagement of the snap-in latch 33 and the snap-in recess 34.

Apart from the counter supporting surfaces 37 and 38 supporting the projection 35, counter supporting surfaces are also provided in the area in which the first component 17 and the second component 18 are movably connected to each other by the living hinge 19. In this area, the additional counter supporting surfaces include a projection 39 and a mutually fitting recess 40, the projection 39 being received by the recess 40 in the closed state.

Figure 6:
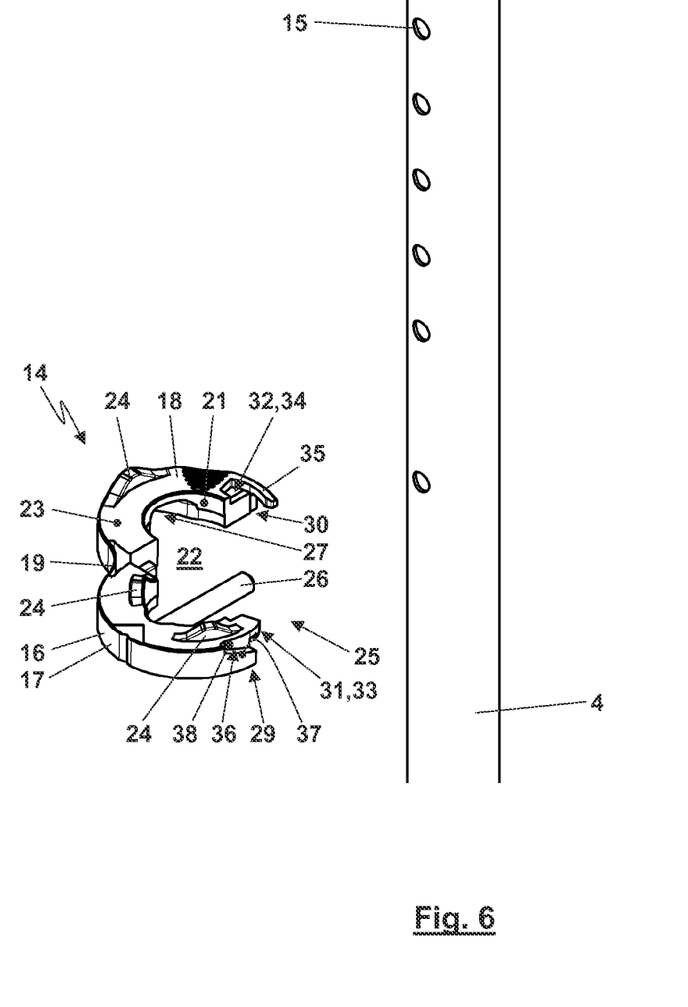
FIG. 6 is a close-up of the rotary fitting shown in FIG. 1 with the rotary bearing shown in FIG. 2 before the rotary bearing is mounted.
Figure 7:
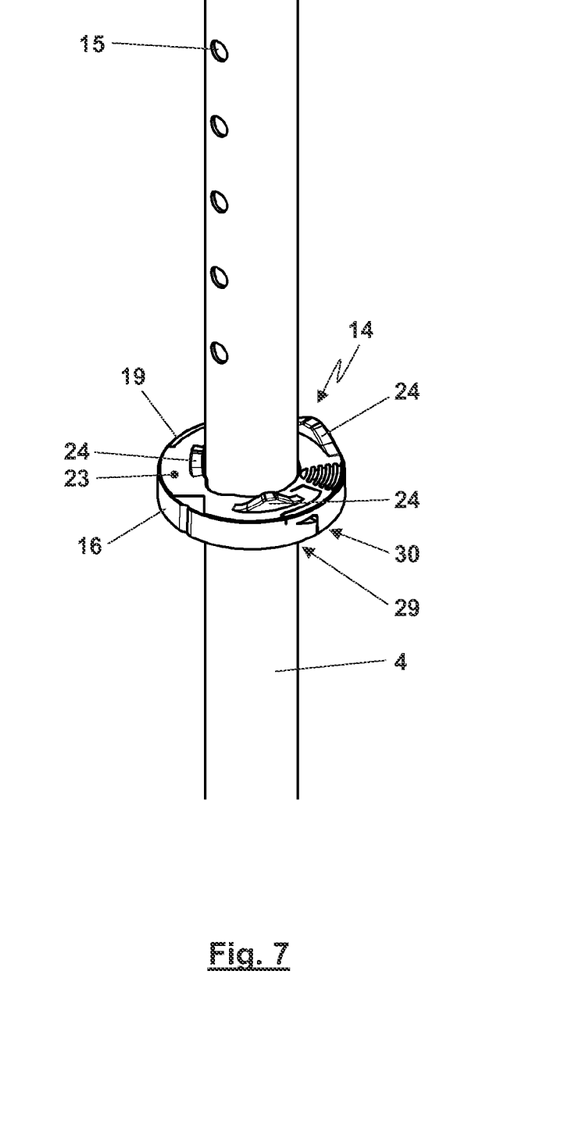
FIG. 7 is a close-up of the rotary fitting shown in FIG. 1 with the rotary bearing shown in FIG. 2 after the rotary bearing has been mounted.

FIG. 6 shows a close-up of the supporting column 4 with a rotary bearing 14 before the rotary bearing 14 is mounted on the supporting column 4. For mounting the rotary bearing 14 to the supporting column 4, the supporting member 16 of the rotary bearing 14 is in its open state. Thus, the access opening 25 is provided such that the supporting column 4 is received in the aperture 22 through the access opening 25, when the rotary bearing 14 is put onto the supporting column 4. In order to put the rotary bearing 14 onto the supporting column 4, the rotary bearing 14 is moved towards the supporting column 4 in radial direction such that the pin 26 passes through one of the transverse clearance holes 15 provided in the supporting column 4. When the pin extends through the transverse clearance hole 15 and the inner surface 20 of the first component 17 of the supporting member 16 is in contact (or nearly in contact) with the outer surface of the supporting column 4, the second component 18 is moved relative to the first component 17 for transferring the supporting member 16 from its open state into its closed state. As shown in FIG. 7, in the closed state, the supporting column 4 is fully surrounded by the supporting member 16, and at the top face 23 of the supporting member 16, the circular tracks are provided. Thus, the rotary bearing 14 mounted to the supporting column 4 is ready for rotably supporting one of the shelves 7.

When the position of one of the shelves 7 needs to be adjusted in axial direction of the supporting column 4, this can be easily achieved by transferring the rotary bearing 14 from the closed state into the open state such that the first component 17 is no longer locked to the second component 18, but the access opening 25 is provided. Then, the supporting member can be removed from the supporting column 4 and mounted in the region of one of the other transverse clearance holes 15 provided in the supporting column 4. Thus, with the rotary bearing 14 being transferable between a closed state and an open state, a rotary fitting is provided which allows for changing the position of the shelves 7 along the supporting column 4 of the rotary fitting 1. In particular, for a transportation of the rotary fitting 1, the rotary bearing 4 may be used as a means for securing the shelves 7 at the supporting column 4, e.g. for securing a staple of shelves 7 at the bottom end of the supporting column 4. After mounting the rotary fitting 1 to a cupboard, the rotary bearing 14 can be removed from the supporting column 4 by opening the supporting member 16. Then, the shelves 7 are free to move along the supporting column 4. To mount the shelves 7 at a particular height at the supporting column 4, first, the shelve 7 is moved upwards such that it is located above the particular height. Then, lei the rotary bearing 14 is attached to the supporting column 4 by putting the pin 26 through the respective transverse clearance hole 15 and closing the supporting member 16. Finally, the shelve 7 can be shifted downwards such that it is supported via its counter bearing 13 on the supporting member 16.

Figure 8:
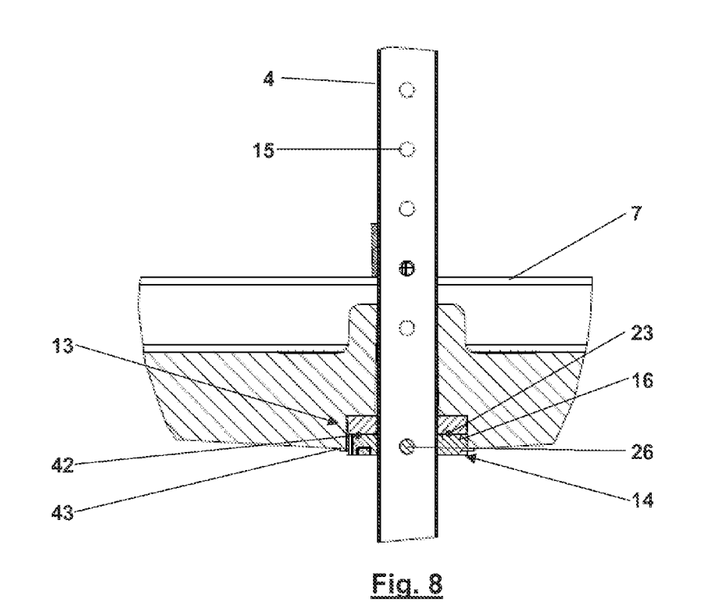
FIG. 8 is a vertical section of the rotary bearing like shown in FIG. 4 supporting a shelve wherein the shelve is in a basic position of rotation.
Figure 9:
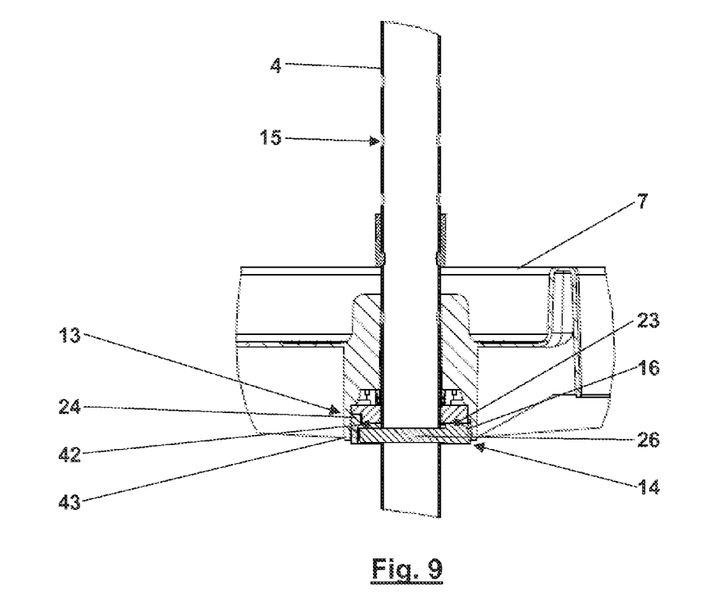
FIG. 9 is a vertical section perpendicular to the vertical section of the rotary bearing supporting the shelve shown in FIG. 8.
Figure 10:
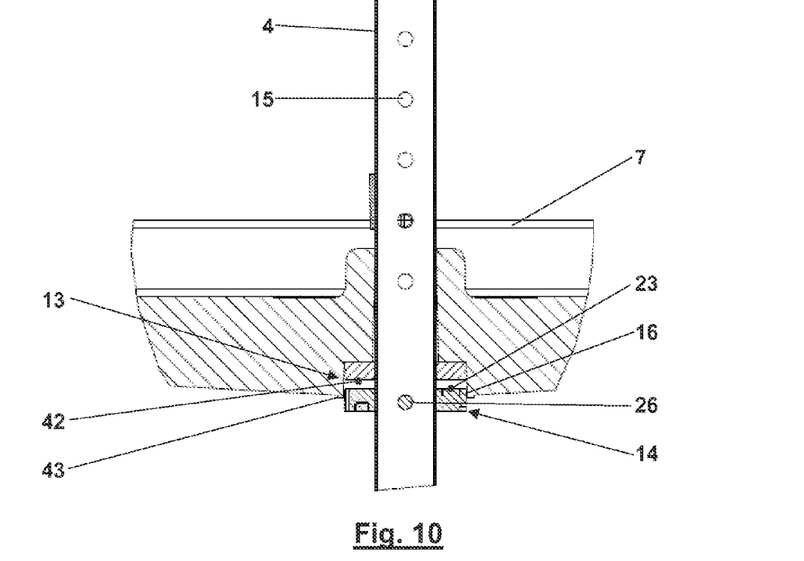
FIG. 10 is a vertical section of the rotary bearing like shown in FIG. 8, wherein the shelve is in another than the basic position of rotation.
Figure 11:
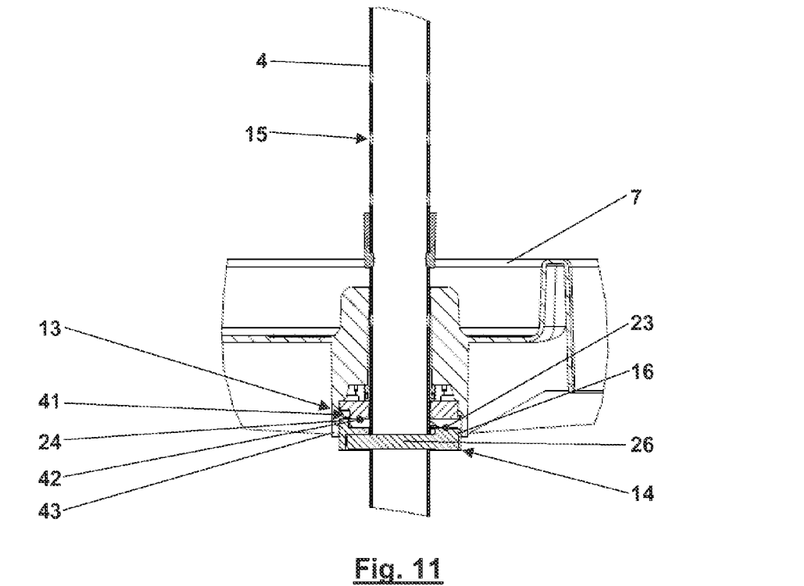
FIG. 11 is a vertical section perpendicular to the vertical section of the rotary bearing supporting the shelve shown in FIG. 10.

FIGS. 8 to 11 show close-up views of vertical sections of the rotary bearing 14 being mounted to the supporting column 4 and supporting the shelve 7. FIGS. 8 and 10 are vertical sections along the longitudinal axis of the pin 26, whereas FIGS. 9 and 11 are vertical sections perpendicular to the longitudinal axis of the pin 26. In FIGS. 8 and 9, the shelve 7 is in the basic position of rotation about the supporting column 4 defined by the projections 24 of the top face 23 of the supporting member 16. In this basic position, the projections 24 are received in respective recesses 41 of the bottom face 42 of the counter bearing 13. In FIGS. 10 and 11, the shelve 7 is in another position than the basic position. To reach this other position in which the projections 24 are no longer received in the respective recesses 41 of the bottom face 42 of the counter bearing 13, the counter bearing 13 and the shelve 7 have not only to be rotated but also to be raised by the height of the projections 24 with regard to the rotary bearing 14. In the other position shown in FIGS. 10 and 11, the shelve 7 can be rotated about the supporting column 4 without any force to be overcome apart from fiction. As shown in FIGS. 8 to 11, the outer rim 43 of the counter bearing 14 projects downwards in axial direction of the supporting column 4. In particular, the outer rim 43 partially overlaps the supporting member 16 in axial direction and circumferentially encircles the top face 23 of the supporting member 16, when the shelve 7 is supported by the rotary bearing 14. By encircling the supporting member 16 in circumferential direction the outer rim 43 stabilizes and secures the supporting member 16 in its closed state. Further, the outer rim 43 may stabilize the lateral positioning of the shelve 7 at the supporting column 4. In addition, it may serve as a guiding means for guiding the rotation of the shelve 7 about the rotary bearing 14 and the supporting column 4.

Many variations and modifications may be made to the preferred embodiments of the invention without departing substantially from the spirit and principles of the invention. All such modifications and variations are intended to be included herein within the scope of the present invention, as defined by the following claims.

We claim:

1. A rotary bearing for rotably supporting an article-carrying member at a supporting column of a rotary fitting of a cupboard, comprising
a supporting member having a top face,
the supporting member comprising a first component and a second component, the first component and the second component being movably connected to each other,
wherein the supporting member has an open state, and a closed state,
wherein the first and the second component, in the closed state of the supporting member, together
define a cylinder envelope shaped inner surface of the supporting member, the cylinder envelope shaped inner surface having a diameter and encircling an aperture of the supporting member, and
provide a circular track at the top face of the supporting member,
wherein the first and the second component, in the open state of the supporting member, provide an access opening to the aperture of the supporting member, the access opening having a width of at least about the diameter of the cylinder envelope shaped inner surface; and
a pin having two ends, the pin—at one of its two ends—being fixed to the first component of the supporting member, and extending from the first component of the supporting member into the aperture.

2. The rotary bearing of claim 1, wherein, in the closed state of the supporting member, the pin extends from the first component to the second component of the supporting member.

3. The rotary bearing of claim 2, wherein the second component comprises a recess for receiving the other of the two ends of the pin in the closed state of the supporting member.

4. The rotary bearing of claim 1, wherein the pin is integrally built with the first component of the supporting member.

5. The rotary bearing of claim 1, wherein the first component of the supporting member is integrally built with the second component of the supporting member.

6. The rotary bearing of claim 1, wherein the first and the second component each encircle about half of the aperture in the closed state of the supporting member.

7. The rotary bearing of claim 1, wherein the first component and the second component are movably connected via a hinge.

8. The rotary bearing of claim 7, wherein the hinge is an integral hinge.

9. The rotary bearing of claim 1, wherein the first component and the second component each having a free end in the open state of the supporting member, comprise mutually fitting snap-in configurations at their free ends, the snap-in configurations locking the first component to the second component in the closed state of the supporting member.

10. The rotary bearing of claim 9,
wherein the snap-in configurations comprise a snap-in latch and a snap-in recess, the snap-in latch engaging in the snap-in recess in the closed state of the supporting member, and
wherein the snap-in configurations comprise counter supporting surfaces for securing the engagement of the snap-in latch in the snap-in recess in the closed state of the supporting member.

11. The rotary bearing of claim 10, wherein the counter supporting surfaces are both provided at the free ends of the first and the second component and in an area in which the first and the second component are movably connected to each other.

12. The rotary bearing of claim 10, wherein the counter supporting surfaces are configured for securing the engagement of the snap-in latch in the snap-in recess in the closed state of the supporting member in both an axial and a radial direction with regard to the cylinder envelope shaped inner surface.

13. The rotary bearing of claim 1,
wherein the first component and the second component each having a free end in the open state of the supporting member, comprise mutually fitting aligning configurations at their free ends,
the aligning configurations configured for aligning the first component to the second when transferring the supporting member from its open state into its closed state.

* * * * *